(12) United States Patent
Cao (10) Patent No.: US 10,949,710 B2
(45) Date of Patent: Mar. 16, 2021

(54) METHODS, SYSTEMS AND APPARATUSES OF FEATURE EXTRACTION AND OBJECT DETECTION (71) Applicant: Nokia Technologies Oy, Espoo (FI)

(72) Inventor: Jiale Cao, Tianjin (CN)

(73) Assignee: Nokia Technologies Oy, Espoo (FI)

( * ) Notice: Subject to any disclaimer, the term of this patent is extended or adjusted under 35 U.S.C. 154(b) by 134 days.

(21) Appl. No.: 16/309,823

(22) PCT Filed: Jun. 15, 2016

(86) PCT No.: PCT/CN2016/085809
§ 371 (c)(1),
(2) Date: Dec. 13, 2018

(87) PCT Pub. No.: WO2017/214872
PCT Pub. Date: Dec. 21, 2017

(65) Prior Publication Data
US 2019/0258897 A1 Aug. 22, 2019

(51) Int. Cl.
*G06K 9/62* (2006.01)
*G06K 9/42* (2006.01)
*G06K 9/46* (2006.01)

(52) U.S. Cl.
CPC ............ *G06K 9/6228* (2013.01); *G06K 9/42* (2013.01); *G06K 9/4642* (2013.01); *G06K 9/4652* (2013.01)

(58) Field of Classification Search
CPC ...... G06K 9/6228; G06K 9/4652; G06K 9/42; G06K 9/4642
See application file for complete search history.

(56) References Cited

U.S. PATENT DOCUMENTS

| 2010/0202707 A1 | 8/2010 | Costache et al. |
| 2010/0220906 A1* | 9/2010 | Abramoff ............ G06T 7/0014 382/130 |
| 2015/0324999 A1* | 11/2015 | Gritsenko ............... G06T 7/149 382/132 |

FOREIGN PATENT DOCUMENTS

| CN | 103810503 A | 5/2014 |
| CN | 104239854 A | 12/2014 |
| CN | 105069774 A | 11/2015 |

OTHER PUBLICATIONS

Jiale Cao, et al., "Learning Multilayer Channel Features for Pedestrian Detection," IEEE Transactions on Image Processing, vol. 26, No. 7, Mar. 1, 2016, pp. 1-8, XP055653248.
(Continued)

*Primary Examiner* — John B Strege
(74) *Attorney, Agent, or Firm* — Fay Sharpe LLP (57) ABSTRACT

Methods, systems and apparatuses of feature extraction and object detection are provided. In the method of feature extraction, a plurality of image channels are generated from each of training images; intra-channel features are extracted from the plurality of image channels for each of training images, wherein the intra-channel features include features independently extracted from a single image channel; cross-channel features are extracted from the plurality of image channels for at least one of the training images, wherein the cross-channel features include features extracted from at least two image channels. The intra-channel features and the cross-channel features form a set of features for feature selection and classifier training. With the above method, cross-channel features, which reflect discriminant information across different image channels, can be further used for object detection together with the intra-channel features, and thus there are much richer features for object detection and better accuracy of object detection can be achieved.

14 Claims, 5 Drawing Sheets

(56) References Cited

OTHER PUBLICATIONS

International Search Report for PCT/CN2016/085809 dated Mar. 21, 2017.

* cited by examiner

Channel i    Channel j

METHODS, SYSTEMS AND APPARATUSES OF FEATURE EXTRACTION AND OBJECT DETECTION

TECHNICAL FIELD

The non-limiting and exemplary embodiments of the present disclosure generally relate to the technical field of object detection and specifically to a method, system and apparatus of feature extraction and a method, system and apparatus of object detection.

BACKGROUND

This section introduces aspects that may facilitate a better understanding of the disclosure. Accordingly, the statements of this section are to be read in this light and are not to be understood as admissions about what is in the prior art or what is not in the prior art.

Object detection is an important technology of computer vision, which is a process of finding instances of real-world objects such as faces, bicycles, and buildings in an image or video. Detecting objects in images or videos plays an important role in the computer vision or a mobile vision system, such as intelligent video surveillance, traffic monitoring, vehicle navigation, camera-based driver assistance, human-machine interaction, etc. The effective and efficient object detection is a presupposition that many tasks like those mentioned above can be started. Therefore, a high performance of object detection is a key for successful image/video analysis.

In the existing solutions, there are various object detection approaches. These object detection approaches typically use extracted features and learning algorithms to recognize instances of an object category. Therefore, feature extraction and feature classification are two key components for object detection, and discrimination of the extracted features limits the upper bound of classification performance. Therefore, the performance of object detection is mainly determined by the performance of feature extraction and classification.

In conventional methods, there are mainly three manners for feature extraction: (1) completely Hand-Crafted (HC) features, (2) Hand-Crafted candidate features followed by Learning Algorithms (HCLA) (e.g., feature selection algorithm), and (3) Deep Leaning (DL) based features. Two examples of classical Hand-Crafted (HC) features comprises Haar-like features and Histograms of Oriented Gradients (HOG), which both had achieved good results in face detection and pedestrian detection, respectively. Deep Learning (DL) features are too complex to be efficiently computed without high-performance hardware. The HCLA features include, for examples, Integral Channel Features (ICF), Aggregated Channel Features (ACF), Locally Decorrelated Channel Features (LDCF), InformedHaar, SquaresChnFtrs Filtered Channel Features (FCF), and non-neighboring features, wherein the ACF, LDCF, InformmedHaar, SquaresChnFtrs, and FCF are all variants of ICF and thus they can also be called as ICF-like features. In common processes of these manners, a set of image channels is first generated from an input image, then each of image channels is divided into patches and features are extracted from these patches, and finally the extracted features are fed into a decision means like a decision forest learned via a classifier training algorithm such as AdaBoost.

Recently, some new ideas were proposed to improve the performance of feature extraction, for example increasing the number of the image channels, using the difference between partial sums instead of partial sum, modifying a division manner of patches in image channels, and so on. However, the obtained performance of feature extraction and object detection still fails to meet the constantly increasing requirements on the performance of object detection.

Therefore, in the art, there is a need for a new solution for feature extraction and object detection.

SUMMARY

Various embodiments of the present disclosure mainly aim at providing methods, systems and apparatuses for feature extraction and object detection to improve accuracy of object detection and achieve a better performance of object detection. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided a method of feature extraction. The method comprises: generating a plurality of image channels from each of training images through a non-linear conversion; extracting intra-channel features from the plurality of image channels for each of training images, wherein the intra-channel features include features independently extracted from a single image channel; and extracting cross-channel features from the plurality of image channels for at least one of the training images, wherein the cross-channel features include features extracted from at least two image channels. The intra-channel features and the cross-channel features form a set of features for feature selection and classifier training.

In one embodiment of the present disclosure, wherein the extracting cross-channel features from the plurality of image channels may comprise: determining the cross-channel features based on patches in one or more patch groups each comprising at least two corresponding patches respectively on the at least two image channels.

In another embodiment of the present disclosure, the extracting cross-channel features from the plurality of image channels may further comprise normalizing, before the determining the cross-channel features, feature values of the patches in the one or more patch groups respectively.

In a further embodiment of the present disclosure, the determining the cross-channel features based on patches in one or more patch groups may comprise: obtaining combined features for respective ones of the at least two image channels from patches on the respective ones of the at least two image channels in the one or more patch groups; obtaining the cross-channel features based on the combined features for the respective ones of the at least two image channels.

In a yet further embodiment of the present disclosure, the determining the cross-channel features based on patches in one or more patch groups may comprise: obtaining a combined feature for a patch group in the one or more patch groups from patches in the patch group; and obtaining the cross-channel feature based on the combined feature for the patch group.

In a still further embodiment of the present disclosure, the determining the cross-channel features based on patches in one or more patch groups may further comprise: obtaining another combined feature for another patch group in the one or more patch groups based on patches in the other patch group. In such a case, the obtaining the cross-channel feature may further comprise: obtaining the cross-channel feature based on the combined feature for the patch group and the other combined feature for the other patch group In a second aspect of the present disclosure, there is provided a method of object detection. The method comprises generating a plurality of image channels from an image through a non-linear conversion; extracting a predetermined intra-channel feature from the plurality of image channels, wherein the predetermined intra-channel feature includes a feature independently extracted from a single image channel; extracting a predetermined cross-channel feature from the plurality of image channels, wherein the predetermined cross-channel feature includes a feature extracted from at least two image channels; and determining whether the image contains a desired object based on the predetermined intra-channel feature and the predetermined cross-channel feature.

In a third aspect of the present disclosure, there is provided a system of feature extraction. The system comprises at least one processor; and at least one memory including a computer program code. The at least one memory and the computer program code are configured to, with the at least one processor, cause the system to at least: generate a plurality of image channels from each of training images through a non-linear conversion; extract intra-channel features from the plurality of image channels for each of training images, wherein the intra-channel features include features independently extracted from a single image channel; and extract cross-channel features from the plurality of image channels for at least one of the training images, wherein the cross-channel features include features extracted from at least two image channels. The intra-channel features and the cross-channel features form a set of features for feature selection and classifier training.

In a fourth aspect of the present disclosure, there is provided a system of feature extraction. The system comprises at least one processor; and at least one memory including a computer program code. The at least one memory and the computer program code are configured to, with the at least one processor, cause the system to at least: generate a plurality of image channels from an image through a non-linear conversion; extract a predetermined intra-channel feature from the plurality of image channels, wherein the predetermined intra-channel feature includes a feature independently extracted from a single image channel; extract a predetermined cross-channel feature from the plurality of image channels, wherein the predetermined cross-channel feature includes a feature extracted from at least two image channels; and determine whether the image contains a desired object based on the predetermined intra-channel feature and the predetermined cross-channel feature.

In a fifth aspect of the present disclosure, there is provided an apparatus of feature extraction. The apparatus comprises an image channel generation module, an intra-channel feature extraction module and a cross-channel feature extraction module. The image channel generation module is configured to generate a plurality of image channels from each of training images through a non-linear conversion. The intra-channel feature extraction module is configured to extract intra-channel features from the plurality of image channels for each of training images, wherein the intra-channel features include features independently extracted from a single image channel. The cross-channel feature extraction module is configured to extract cross-channel features from the plurality of image channels for at least one of the training images, wherein the cross-channel features include features extracted from at least two image channels. The intra-channel features and the cross-channel features form a set of features for feature selection and classifier training.

In a sixth aspect of the present disclosure, there is provided an apparatus of object detection. The apparatus comprises an image channel generation module, a predetermined intra-channel feature extraction module, a predetermined cross-channel feature extraction module and an image classification module. The image channel generation module is configured to generate a plurality of image channels from an image through a non-linear conversion. The predetermined intra-channel feature extraction module is configured to extract a predetermined intra-channel feature from the plurality of image channels, wherein the predetermined intra-channel features include features independently extracted from a single image channel. The predetermined cross-channel feature extraction module configured to extract a predetermined cross-channel feature from the plurality of image channels, wherein the predetermined cross-channel features include a feature extracted from at least two image channels. The image classification module is configured to determine whether the image contains a desired object based on the predetermined intra-channel feature and the predetermined cross-channel feature.

In a seventh aspect of the present disclosure, there is provided a computer program product comprising computer program codes stored thereon, the computer program codes configured to, when executed, cause an apparatus to perform actions in the method according to any of embodiments of the first aspect of the present disclosure.

In an eighth aspect of the present disclosure, there is provided is provided a computer program product comprising computer program codes stored thereon, the computer program codes configured to, when executed, cause an apparatus to perform actions in the method according to the second aspect of the present disclosure.

With the solution of the present disclosure, a plurality of image channels are generated from each of training images by means of a non-linear conversion, and the intra-channel features reflecting discriminant information within image channels and cross-channel features reflecting discriminant information cross different image channel can be extracted from these image channels. Thus, in addition to the intra-channel features, the intra-channel features can be further used for object detection, and thus there are much richer features for object detection and better accuracy of object detection can be achieved.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or signs are used to designate like or equivalent elements. The drawings are illustrated for facilitating better understanding of the embodiments of the disclosure and not necessarily drawn to scale, in which.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. In addition, in the following description and claims, unless defined otherwise, all technical and scientific terms used herein have the same meaning as commonly understood by one of ordinary skills in the art to which this disclosure belongs.

Figure 1:
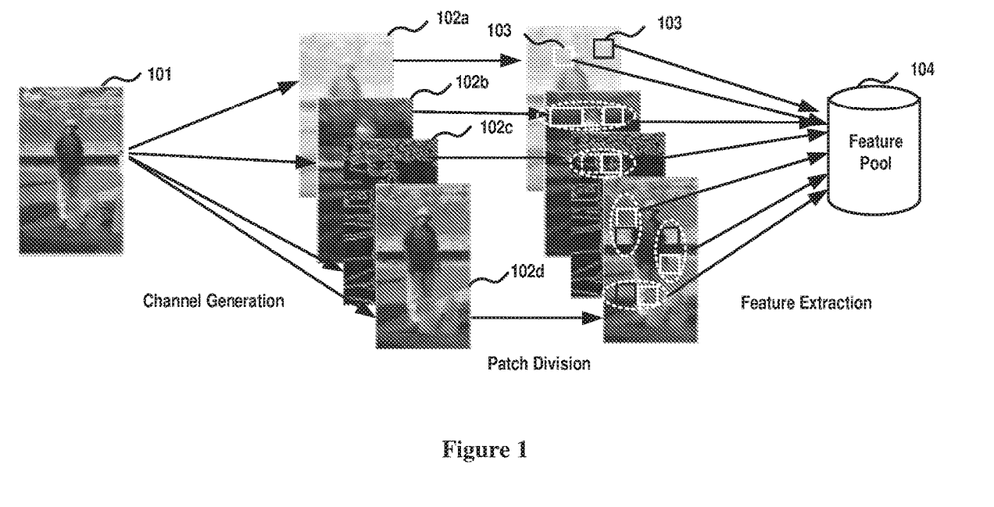
FIG. 1 schematically illustrates an example feature extraction process in prior art.

Hereinafter, reference will be first made to FIG. 1 to describe an example feature extraction process in prior art. As illustrated in FIG. 1, for an input image 101, a set of image channels 102a to 102d is first generated from the input image 101, then each of image channels 102a to 102d is divided into a plurality of patches 103 and from respective patches 103, features are extracted and the extracted features are stored into a feature pool 104. All of the extracted features stored in the feature pool 104 can be further used for feature selection and classifier training to obtain a trained classifier. By means of the trained classifier, it may detect whether an image contains a desired object.

However, discrimination of the obtained features is still not large enough to achieve an efficiency and efficient object detection yet. In view of this, in embodiments of the present disclosure, there is provided a new solution for feature extraction and object detection. Hereinafter, reference will be made to FIGS. 2 to 9 to describe the solution for feature extraction and object detection as provided herein in detail.

Figure 2:
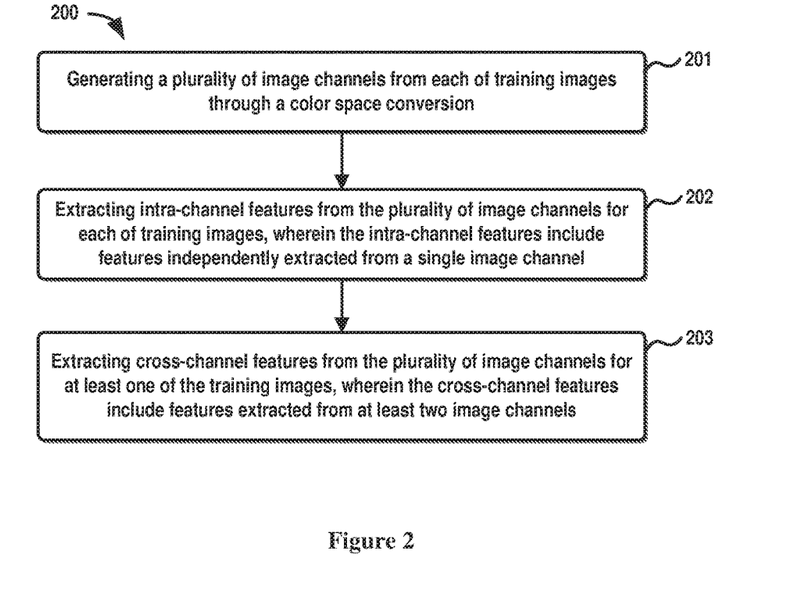
FIG. 2 schematically illustrates a flow chart of a method of feature extraction according to an embodiment of the present disclosure.

FIG. 2 schematically illustrates a flow chart of a method 200 of feature extraction according to an embodiment of the present disclosure. As illustrated in FIG. 2, the method starts from step 201 in which a plurality of image channels are generated from each of training images through a non-linear conversion, for example, a color space conversion. An image taken from a common camera is usually an RGB (Red Green Blue) image. RGB is an additive color model in which red, green, and blue lights are added together in various ways to reproduce a broad array of colors. In other words, the RGB image contains three overlapped image channels, a red (R) channel, a green (G) channel, and a blue (B) channel. However, in embodiments of the present disclosure, the image channels are not the R channel, the G channel and the B channels contained in the original RGB image but obtained from the RGB image through a non-linear conversion like the color space conversion. As an illustrative but non-limiting example, the image can be converted from an RGB space to an LUV space. LUV is a color model defined by the International Commission on Illumination (CIE) in 1976, which is different from the RGB color model and uses L, U, V to represent a color, wherein L represents luma, U represents chroma of red and green and V represents chroma of yellow and blue. The LUV can better reflect color characteristics of an image than the RGB. In addition, in another embodiment of the present disclosure, further image channels can be generated. For example, it may further obtain an image channel comprising gradient information which can characterize changes in object edges in an image, for example in the RGB domain or in LUV space. Thus, it is clear that in the embodiments of the present disclosure, the image channels represent different characteristics of an image, in other words, these image channels are heterogeneous.

Figure 3:
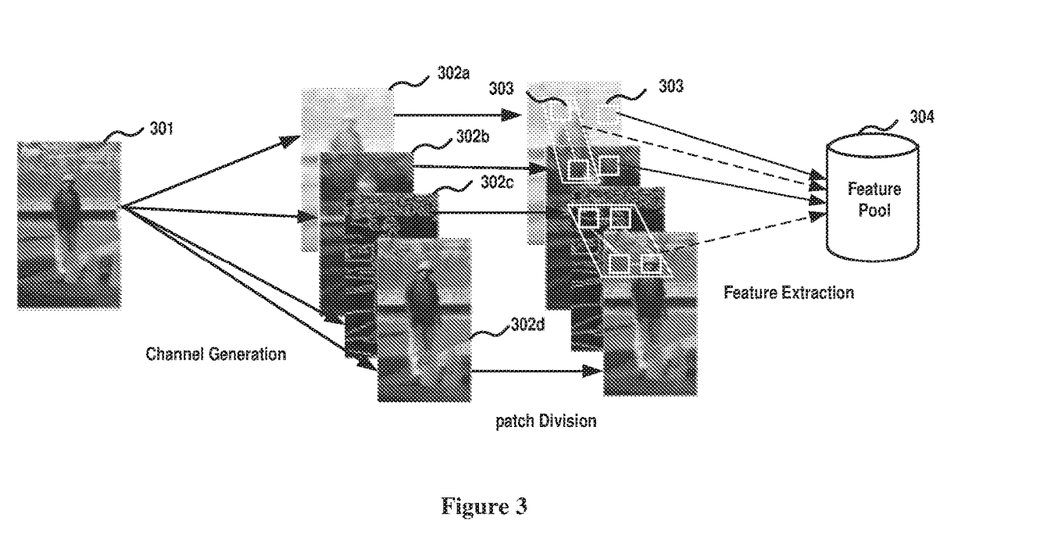
FIG. 3 schematically illustrates an example feature extraction process according to an embodiment of the present disclosure.

For illustrative purposes, FIG. 3 illustrates an example feature extraction according to an embodiment of the present disclosure. For each of training images 301, image channels 302a to 302d are generated, which can be for example L image channel, U image channel, V image channel and a gradient image channel.

Reference is made back to FIG. 2, at step 202, intra-channel features are then extracted from the plurality of image channels for each of the training images. Herein, the term "intra-channel features" mean features independently extracted from a single image channel. In other word, all intra-channel features are independent extracted from respective image channel and thus they reflect the information contained in individual image channels. After generating the plurality of image channels, each of the image channels are divided into a plurality of patches 303. The division of images is known in the art and thus will not be detailed herein. For an image channel, the intra-channel features can be generated from patches 303 on the image channel. In embodiments of the present disclosure, the intra-channel feature can be extract from one or more patches 303 on the image channel as long as it is extracted from a single image channel. In FIG. 3, the extraction of intra-channel features is shown by solid lines pointing toward the feature pool 304.

Afterwards, at step 203, cross-channel features are extracted from the plurality of image channels for at least one of the training images. The term "cross-channel features" used herein means features extracted from at least two image channels. Unlike the intra-channel features independently extracted from a single image channel, the cross-channel features are features jointly extracted from at least two image channels and thus they are results that different image channels work collaboratively for feature extraction. Therefore, the cross-channel features can reflect the information across different image channels. It is noticed that there might be some relationship between different channels and those information might be taken as complementary features for object detection. In FIG. 3, the extraction of the cross-channel features is shown by dashed solid lines pointing toward the feature pool 304.

In an embodiment of the present disclosure, the extraction of cross-channel features may comprise determining the cross-channel features based on patches in one or more patch groups. The term "patch group" used herein means a group containing at least two corresponding patches respectively on the at least two image channels. The term "corresponding patches" means patches on respective image channels which are located on similar location or have a predetermined location relationship. For illustrative purposes, cross-channel features will be described in details with reference to FIGS. 4A to 4C.

Figure 4A:
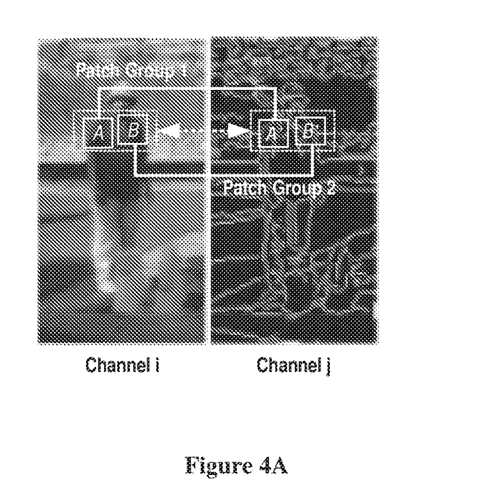
FIGS. 4A to 4C schematically illustrate example cross-channel feature extraction schemes according to an embodiment of the present disclosure.
Figure 4B:
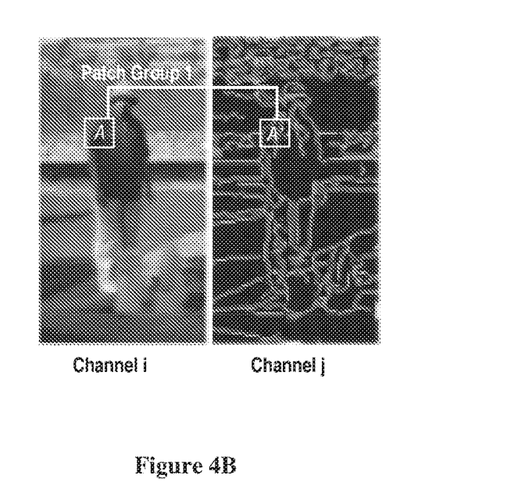
Figure 4C:
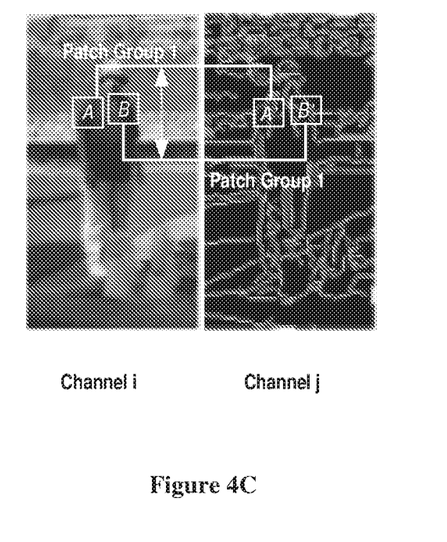

In FIGS. 4A to 4C, there are illustrated four patches A, B, A', and B', wherein patches A and B are two patches on channel i, and patches A' and B' are another patches on another channel j. The patches A and A' are located at the same location of the image and thus are corresponding patches, and the patches B and B' are located at the same location of the image and thus are corresponding patches. In addition, due to the fact that feature values of different image channels might differ from each other in data type, units, dimension, etc., it may first normalize feature values of the patches in the one or more patch groups respectively, before the determining the cross-channel features. However, it shall be noticed the normalizing is not necessary step and in many cases, the method can also work without normalizing. It shall be appreciated that although in FIG. 4A to 4C, two image channels are illustrated, it is also possible to use more than two image channels.

Reference is first made to FIG. 4A, which illustrates an example cross-channel feature extraction scheme according to an embodiment of the present disclosure. In this embodiment of the present disclosure, combined features for respective ones of the at least two image channels are determined from patches on the respective ones of the at least two image channels in the one or more patch groups, and then the cross-channel features is obtained based on the combined features for the respective ones of the at least two image channels. Particularly, as illustrated in FIG. 4A, a first combined feature for channel i is extracted from patches A and B on channel i and a second combined feature for channel j is extracted from patches A' and B' on channel j. Then the first combined feature and the second combined feature can be used to obtain the cross-channel feature. This process can be expressed by the following equation:

$$f1=G3(G1(A,B),G2(A',B'))\qquad\text{Equation 1}$$

wherein f1 represents the cross-channel feature, G1 and G2 represent two functions for calculating the combined feature for channel i and channel j respectively, which can be identical or different and G3 represents another function of calculating the cross-channel features based on the combined features. These functions can be selected by the skilled in the art based on properties of image channels i and j and thus will not be described herein. It shall be noticed that although the extraction of cross-channel features is described with FIG. 4A which illustrates two patches groups, it is also possible to use more patches groups.

FIG. 4B illustrates an example cross-channel feature extraction according to another embodiment of the present disclosure. In this embodiment of the present disclosure, a combined feature for a patch group in the one or more patch groups is first obtained from patches in the patch group and then the cross-channel feature is obtained based on the combined feature for the patch group. Particularly, in FIG. 4, a combined feature for the patch group comprising patch A and patch A' is obtained from the two patches A and A' and then the cross-feature feature is obtained based on the combined feature. The process of cross-channel feature extraction can be expressed by:

$$f2=G5(G4(A,A'))\qquad\text{Equation 2}$$

wherein f2 represents the cross-channel feature, G4 represents a function for calculating the combined feature for the patch group, and G5 represents a function of calculating the cross-channel feature based on the combined feature. These functions can be selected by the skilled in the art based on properties of patches in the patch group and thus will not be described herein. Besides, it can be also appreciated that although G5 is used as a function of calculating the cross-channel feature based on the combined feature, it is also possible to use the combined feature itself as the cross-channel feature, which means G5=1.

FIG. 4C illustrates an example cross-channel feature extraction according to a further embodiment of the present disclosure. In this embodiment of the present disclosure, in addition to the combined feature for the patch group as illustrated in FIG. 4B, another combined feature for another patch group is further determined based on patches in the other patch group, and the cross-channel feature is obtained based on both the combined feature for the patch group and the other combined feature for the other patch group. Particularly, in FIG. 4C, a first combined feature for the patch group comprising patch A and patch A' is obtained from the two patches A and A' and a second combined feature for the patch group comprising patch B and patch B' is obtained from the two patches B and B'. Then the cross-feature feature is obtained based on the first combined feature and the second combined feature. The process of cross-channel feature extraction can be expressed by:

$$f3=G7(G4(A,A'),G6(B,B'))\qquad\text{Equation 3}$$

wherein f3 represents the cross-channel feature, G4 and G6 represent functions for calculating the combined features for two patch groups respectively, which can be identical or different; and G7 represents a function of calculating the cross-channel feature based on the combined features. It shall be also noticed that although the extraction of cross-channel features is described with FIG. 4C which illustrates two patches groups, it is also possible to use more patches groups.

In a more specific embodiment of the present disclosure, A and B measure areas of two patches on and A' and B' measures heights of two patches. In such a case, it may use the flowing equation to calculate the cross-channel feature;

$$F = A \times A' - B \times B' \quad \text{Equation 4}$$

Therefore, the cross-channel feature F characterizes the difference between volumes of the two patches.

The intra-channel features extracted at step 202 and the cross-channel features extracted at step 203 form a set of features, which can be stored in a feature pool 304 as illustrated in FIG. 3, for feature selection and classifier training. Through the feature selection, at least some features among the set of features can be selected as features for object detection. After classifier training, it may obtain a classifier or classification model for object detection. Based on the classifier or classification model, it may perform object detection in testing images or images in real applications.

It shall be noticed that although the extraction of intra-channel features is described as operating before the cross-channel features, the present disclosure is not limited thereto. The two operations can be performed inversely or in parallel.

Thus, it can be seen that in the solution of the present disclosure, a plurality of image channels are generated from each of training images by means of a non-linear conversion, and the intra-channel features reflecting discriminant information within image channels and cross-channel features reflecting discriminant information cross different image channel can be extracted from these image channels. Thus, in addition to the intra-channel features, the intra-channel features can be further used for object detection, and thus there are much richer features for object detection and better accuracy of object detection can be achieved.

Figure 5:
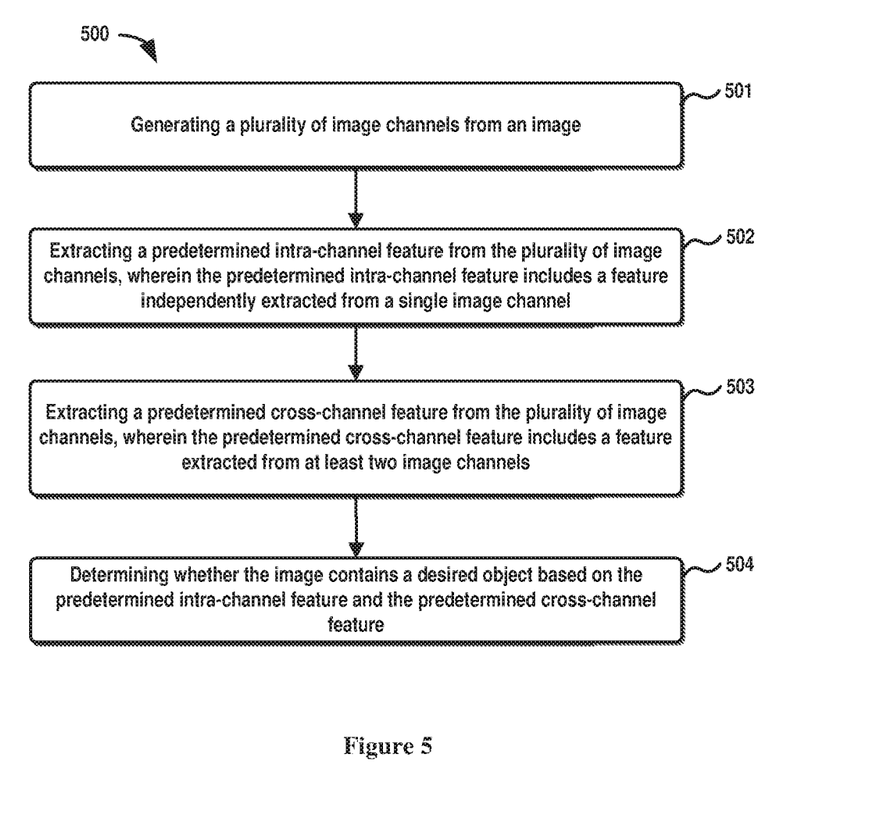
FIG. 5 schematically illustrates a flow chart of a method of object detection according to an embodiment of the present disclosure.

Hereinafter, reference will be made to FIG. 5 to describe the solution of object detection. Reference is made to FIG. 5, the method 500 starts from step 501, in which a plurality of image channels are generated from an image through a non-linear conversion. Herein, the plurality of image channels are similar to the plurality of image channels for feature extraction, for example, comprise LUV image channels and a gradient channel. The generation of image channels in detecting an object is also similar to that described with reference to FIG. 2 and thus detailed description thereof will be omitted herein.

Then at step 502, a predetermined intra-channel feature is extracted from the plurality of image channels, wherein the predetermined intra-channel feature includes a feature independently extracted from a single image channel. It shall be noticed that unlike the feature extraction process, it does not extract all possible intra-channel features but one or more predetermined intra-channel features selected for object detection during the feature selection.

At step 503, a predetermined cross-channel feature is extracted from the plurality of image channels, wherein the predetermined cross-channel feature includes a feature extracted from at least two image channels. Herein, the predetermined cross-channel feature also means one or more predetermined cross-channel features selected for object detection during the feature selection. The at least two image channels for cross-channel extraction represents, for example, different characteristics of an image.

In an embodiment of the present disclosure, the extracting predetermined cross-channel feature may be implemented by determining the predetermined cross-channel feature based on patches in one or more patch groups each comprising at least two corresponding patches respectively on the at least two image channels. Before the determining the predetermined cross-channel feature, feature values of the patches in the one or more patch groups may be first normalized respectively.

Specifically, the determining the predetermined cross-channel feature based on patches in one or more patch groups may comprise obtaining combined features for respective ones of the at least two image channels from patches on respective ones of the at least two image channels in the one or more patch groups; and obtaining the predetermined cross-channel feature based on the combined features for the respective ones of the at least two image channels. As an alternative solution, the determining the predetermined cross-channel feature based on patches in one or more patch groups may comprise: obtaining a combined feature for a patch group in the one or more patch groups from patches in the patch group; and obtaining the predetermined cross-channel feature based on the combined feature for the patch group. In addition, it may further obtain another combined feature for another patch group in the one or more patch groups based on patches in the other patch group. In such a case, the obtaining the predetermined cross-channel feature may comprise: obtaining the predetermined cross-channel feature based on the combined feature for the patch group and the other combined feature for the other patch group.

Reference is made back to FIG. 5, after extracting the predetermined intra-channel feature and the predetermine cross-channel feature, at step 504 it is determined whether the image contains a desired object based on the predetermined intra-channel feature and the predetermined cross-channel feature through the trained classifier or the generated classification model.

It shall be noticed that the generation of image channels, the extraction of predetermined intra-cross feature and the extraction of predetermined cross-channel feature are substantially similar to those described hereinbefore with reference to feature extraction and thus will not be detailed herein.

Figure 6:
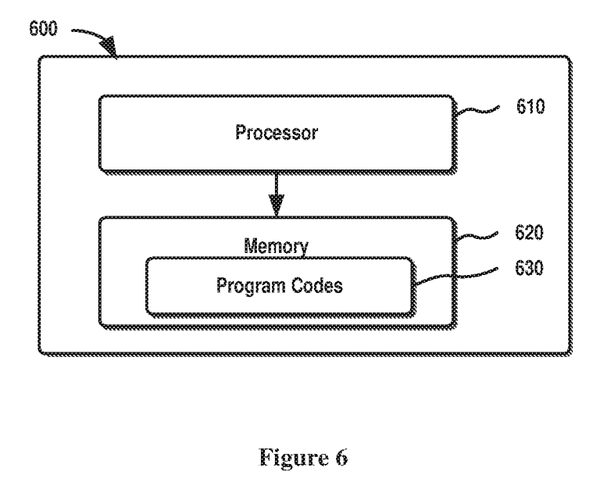
FIG. 6 illustrates a schematic block diagram of a system of feature extraction according to an embodiment of the present disclosure.

Reference is made to FIG. 6, which illustrates a schematic block diagram of a system 600 of feature extraction according to an embodiment of the present disclosure. As illustrated in FIG. 6, the system 600 includes at least one processor 610; and at least one memory 620 including a computer program code 630. The at least one memory 620 and the computer program code 630 are configured to, with the at least one processor 610, cause the system 600 to at least: generate a plurality of image channels from each of training images through a non-linear conversion; extract intra-channel features from the plurality of image channels for each of training images, wherein the intra-channel features include features independently extracted from a single image channel; and extract cross-channel features from the plurality of image channels for at least one of the training images, wherein the cross-channel features include features extracted from at least two image channels, wherein the intra-channel features and the cross-channel features form a set of features for feature selection and classifier training. Particularly, the at least two image channels represent different characteristics of an image.

The extracting cross-channel features from the plurality of image channels may comprise: determining the cross-channel features based on patches in one or more patch groups each comprising at least two corresponding patches respectively on the at least two image channels. Before the determining the cross-channel features, feature values of the patches in the one or more patch groups can be first normalized respectively.

In an embodiment of the present disclosure, combined features for respective ones of the at least two image channels can be obtained from patches on the respective ones of the at least two image channels in the one or more patch groups and then it may use the combined features for the respective ones of the at least two image channels to obtain the cross-channel features is obtained. Alternatively, a combined feature for a patch group in the one or more patch groups can be obtained from patches in the patch group; and then the cross-channel feature is obtained based on the combined feature for the patch group. In addition, another combined feature for another patch group in the one or more patch groups may be further obtained based on patches in the other patch group. In such a case, the cross-channel feature can be obtained based on the combined feature for the patch group and the other combined feature for the other patch group.

Figure 7:
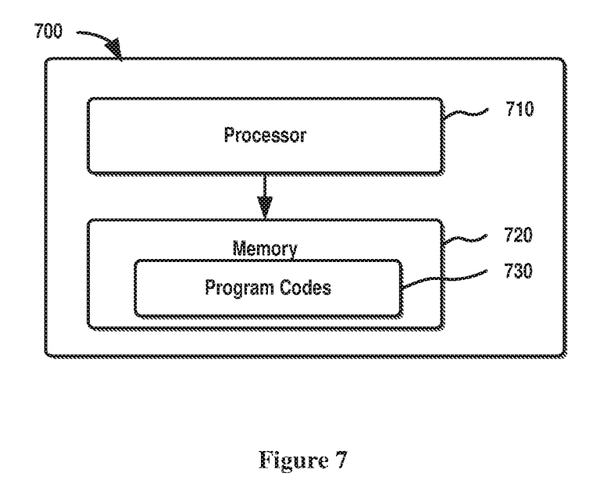
FIG. 7 illustrates a schematic block diagram of a system for object detection according to an embodiment of the present disclosure.

Reference is further made to FIG. 7, which illustrates a schematic block diagram of a system 700 for object detection according to an embodiment of the present disclosure. As illustrated in FIG. 7, the system 700 may comprise at least one processor 710 and at least one memory 720 including a computer program code 730. The at least one memory 720 and the computer program code 730 are configured to, with the at least one processor 710, cause the system 700 to at least generate a plurality of image channels from an image through a non-linear conversion; extract a predetermined intra-channel feature from the plurality of image channels, wherein the predetermined intra-channel feature includes a feature independently extracted from a single image channel; extract a predetermined cross-channel feature from the plurality of image channels, wherein the predetermined cross-channel feature includes a feature extracted from at least two image channels; and determine whether the image contains a desired object based on the predetermined intra-channel feature and the predetermined cross-channel feature. The at least two image channels can represent different characteristics of an image.

The extracting predetermined cross-channel feature from the plurality of image channels may comprise: determining the predetermined cross-channel feature based on patches in one or more patch groups each comprising at least two corresponding patches respectively on the at least two image channels. Before the determining the predetermined cross-channel feature, feature values of the patches in the one or more patch groups can be normalized respectively.

In an embodiment of the present disclosure, the determining the predetermined cross-channel feature based on patches in one or more patch groups may comprise: obtaining combined features for respective ones of the at least two image channels from patches on the respective ones of the at least two image channels in the one or more patch groups; and obtaining the predetermined cross-channel feature based on the combined features for the respective ones of the at least two image channels. Alternatively, the determining the predetermined cross-channel feature based on patches in one or more patch groups may comprise: obtaining a combined feature for a patch group in the one or more patch groups from patches in the patch group; and obtaining the predetermined cross-channel feature based on the combined feature for the patch group. In addition, it may further obtain another combined feature for another patch group in the one or more patch groups based on patches in the other patch group. In such a case, the predetermined cross-channel feature can be determined based on the combined feature for the patch group and the other combined feature for the other patch group.

Figure 8:
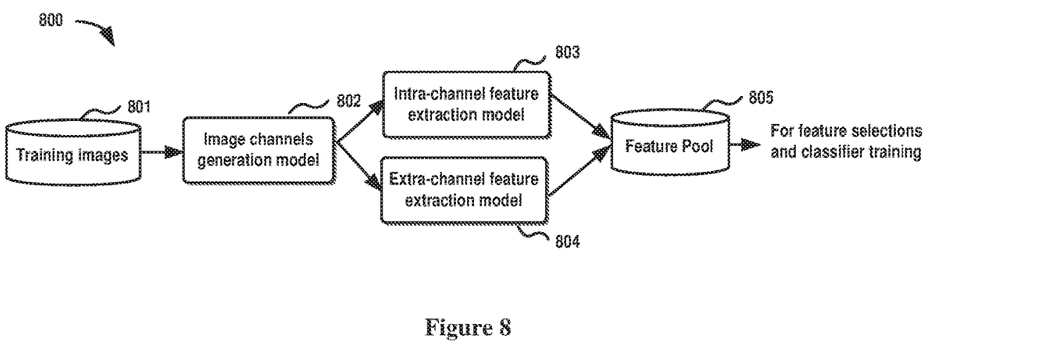
FIG. 8 illustrates a schematic block diagram of an apparatus for feature extraction according to an embodiment of the present disclosure.

FIG. 8 illustrates a schematic block diagram of an apparatus for feature extraction according to an embodiment of the present disclosure. As illustrated in FIG. 8, the apparatus 800 comprises an image channel generation module 802, an intra-channel feature extraction module 803, and a cross-channel feature extraction module 804. The image channel generation module 802 may be configured to generate a plurality of image channels from each of training images through a non-linear conversion. These training images can be store in an image storage 801 and particularly, the at least two image channels represent different characteristics of an image. The intra-channel feature extraction module 803 may be configured to extract intra-channel features from the plurality of image channels for each of training images, wherein the intra-channel features include features independently extracted from a single image channel. The cross-channel feature extraction module 804 may be configured to extract cross-channel features from the plurality of image channels for at least one of the training images, wherein the cross-channel features include features extracted from at least two image channels. The intra-channel features and the cross-channel features form a set of features for feature selection and classifier training. The extracted intra-channel and the cross-channel features may be stored in feature pool 805.

The cross-channel feature extraction module 804 may be configured to extract cross-channel features by determining the cross-channel features based on patches in one or more patch groups each comprising at least two corresponding patches respectively on the at least two image channels. The cross-channel feature extraction module 804 may be further configured to first normalize, before the determining the cross-channel features, feature values of the patches in the one or more patch groups respectively.

In an embodiment of the present disclosure, the cross-channel feature extraction module 804 may be configured to obtain combined features for respective ones of the at least two image channels from patches on the respective ones of the at least two image channels in the one or more patch groups and use the combined features for the respective ones of the at least two image channels to obtain the cross-channel features is obtained. Alternatively, the cross-channel feature extraction module 804 may be configured to obtain a combined feature for a patch group in the one or more patch groups from patches in the patch group; and then obtain the cross-channel feature based on the combined feature for the patch group. In addition, the cross-channel feature extraction module 804 may be further configured to further obtain another combined feature for another patch group in the one or more patch groups based on patches in the other patch group. In such a case, the cross-channel feature may be obtained based on the combined feature for the patch group and the other combined feature for the other patch group.

Figure 9:
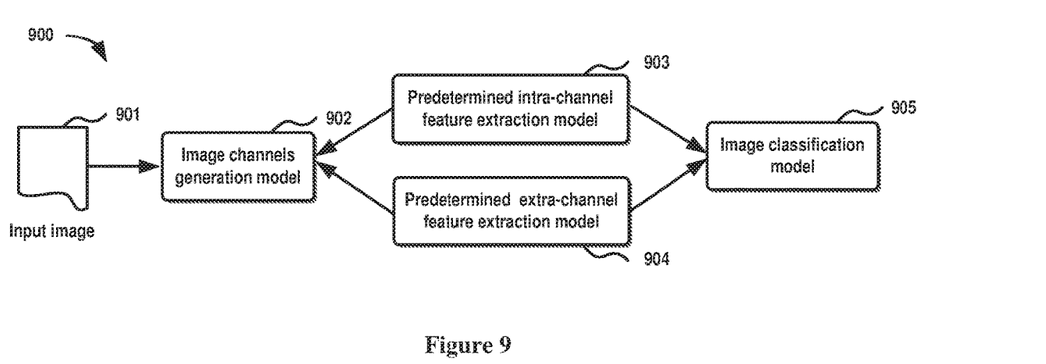
FIG. 9 illustrates a schematic block diagram of an apparatus for object detection according to an embodiment of the present disclosure.

FIG. 9 illustrates a schematic block diagram of an apparatus 900 for object detection according to an embodiment of the present disclosure. As illustrated in FIG. 9, the apparatus 900 comprises an image channel generation module 902, a predetermined intra-channel feature extraction module 903, a predetermined cross-channel feature extraction module 904, and an image classification module 905. The image channel generation module 902 may be configured to generate a plurality of image channels from an image 901 through a non-linear conversion. The predetermined intra-channel feature extraction module 903 may be configured to extract a predetermined intra-channel feature from the plurality of image channels, wherein the predetermined intra-channel features include features independently extracted from a single image channel. The predetermined cross-channel feature extraction module 904 may be configured to extract a predetermined cross-channel feature from the plurality of image channels, wherein the predetermined cross-channel features include a feature extracted from at least two image channels. The image classification module 905 may be configured to determine whether the image contains a desired object based on the predetermined intra-channel feature and the predetermined cross-channel feature.

In embodiment of the present disclosure, the predetermined cross-channel feature extraction module 904 is configured to determine the predetermined cross-channel feature based on patches in one or more patch groups each comprising at least two corresponding patches respectively on the at least two image channels. The predetermined cross-channel feature extraction module 904 may be further configured to normalize, before the determining the predetermined cross-channel feature, feature values of the patches in the one or more patch groups respectively.

In an embodiment of the present disclosure, the predetermined cross-channel feature extraction module 904 may be configured to obtain combined features for respective ones of the at least two image channels from patches on the respective ones of the at least two image channels in the one or more patch groups; and obtain the predetermined cross-channel feature based on the combined features for the respective ones of the at least two image channels. Alternatively, the predetermined cross-channel feature extraction module 904 may be configured to obtain a combined feature for a patch group in the one or more patch groups from patches in the patch group; and obtain the predetermined cross-channel feature based on the combined feature for the patch group. In addition, the predetermined cross-channel feature extraction module 904 may configured to further obtain another combined feature for another patch group in the one or more patch groups based on patches in the other patch group. In such a case, the predetermined cross-channel feature may be determined based on the combined feature for the patch group and the other combined feature for the other patch group.

In addition, the present disclosure may also provide a carrier containing the computer program as mentioned above, wherein the carrier is one of an electronic signal, optical signal, radio signal, or a computer program produce such as computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

It shall be noticed that operations in systems 600, 700, apparatus 800 and 900 are similar to those described hereinbefore with reference to the methods of feature extraction and object detection and thus will not be detailed herein.

It shall be also noticed that The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these details should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method of feature extraction, comprising:
   generating a plurality of image channels from a plurality of training images through color space conversion;
   dividing the plurality of image channels into a plurality of patches, wherein patches on different image channels located at a similar location or having a predetermined location relationship form one or more patch groups;
   extracting features from the plurality of patches independently on a single image channel of the plurality of image channels to obtain intra-channel features reflecting information containing in individual image channels;

extracting features jointly from at least two channels of the plurality of image channels based on the one or more patch groups to obtain cross-channel features reflecting information across different image channels, and training a classifier using at least some of the intra-channel features and the cross-channel features to detect a desired object in an image.

2. The method of claim 1, wherein the extracting features jointly from at least two channels of the plurality of image channels further comprises:

determining a first combined feature for a first channel of the at least two channels from a first patch belonging to a first patch group and a second patch belonging to a second patch group;

determining a second combined feature for a second channel of the at least two channels from a third patch belonging to the first patch group and a fourth patch belonging to the second patch group; and using the first combined feature and the second combined feature to obtain the cross-channel features.

3. The method of claim 2, further comprising:

normalizing, before extracting features jointly from at least two channels, feature values of the patches in the one or more patch groups.

4. The method of claim 2, wherein the plurality of image channels further comprises a gradient image channel.

5. The method of claim 1, wherein the extracting features jointly from at least two channels of the plurality of image channels comprises:

obtaining a first combined feature for a first patch group in the one or more patch groups from the patches in the first patch group; and obtaining the cross-channel feature based on the first combined feature.

6. The method of claim 5, wherein the extracting features jointly from at least two channels of the plurality of image channels comprises:

obtaining a second combined feature for a second patch group in the one or more patch groups from the patches in the second patch group; and obtaining the cross-channel feature based on the first combined feature and the second combined feature.

7. An apparatus comprising:

at least one processor; and at least one memory including a computer program code;

the at least one memory and the computer program code configured to, with the at least one processor, cause the apparatus to at least:

generate a plurality of image channels from a plurality of training images through color space conversion;

divide the plurality of image channels into a plurality of patches, wherein patches on different image channels located at a similar location or having a predetermined location relationship form one or more patch groups;

extract features from the plurality of patches independently on a single image channel of the plurality of image channels to obtain intra-channel features reflecting information containing in individual image channels extract features jointly from at least two channels of the plurality of image channels based on the one or more patch groups to obtain cross-channel features reflecting information across different image channels;

train a classifier using the intra-channel features and the cross-channel features to detect a desired image in an image.

8. The apparatus of claim 7, wherein the at least one memory and the computer program code are configured to, with the at least one processor, cause the apparatus to at least:

determine a first combined feature for a first channel of the at least two channels from a first patch belonging to a first patch group and a second patch belonging to a second patch group;

determine a second combined feature for a second channel of the at least two channels from a third patch belonging to the first patch group and a fourth patch belonging to the second patch group; and use the first combined feature and the second combined feature to obtain the cross-channel features.

9. The apparatus of claim 8, wherein the at least one memory and the computer program code are configured to, with the at least one processor, cause the apparatus to at least:

normalize, before extracting features jointly from at least two channels, feature values of the patches in the one or more patch groups.

10. The system of claim 8, wherein the plurality of image channels further comprise a gradient image channel.

11. The apparatus of claim 8, wherein the at least one memory and the computer program code are configured to, with the at least one processor, cause the apparatus to at least:

obtain a first combined feature for a first patch group in the one or more patch groups from the patches in the first patch group; and obtain the cross-channel feature based on the first combined feature.

12. The apparatus of claim 11, wherein the at least one memory and the computer program code are configured to, with the at least one processor, cause the apparatus to at least:

obtain a second combined feature for a second patch group in the one or more patch groups from the patches in the second patch group; and obtain the cross-channel feature based on the first combined feature and the second combined feature.

13. The apparatus of claim 7, wherein the at plurality of image channels represent different characteristics of an image.

14. A system comprising:

at least one processor; and at least one memory including a computer program code;

the at least one memory and the computer program code configured to, with the at least one processor, cause the system to at least:

determine, using a classifier trained according to the method of claim 1, whether an image contains a desired object.

* * * * *